(12) United States Patent
Tanigawa

(10) Patent No.: US 6,835,031 B2
(45) Date of Patent: Dec. 28, 2004

(54) MACHINE TOOL HAVING AN IMPROVED COVER

(75) Inventor: Osamu Tanigawa, Kounan (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 93 days.

(21) Appl. No.: 10/396,273

(22) Filed: Mar. 25, 2003

(65) Prior Publication Data

US 2003/0185641 A1 Oct. 2, 2003

(30) Foreign Application Priority Data

Mar. 26, 2002 (JP) ......................................... 2002-086226

(51) Int. Cl.⁷ ........................... B23C 1/027; B23Q 11/08
(52) U.S. Cl. ......................... 409/134; 409/137; 409/136
(58) Field of Search ................................. 409/134–137; 408/241 G; 29/DIG. 56, DIG. 59, DIG. 60, DIG. 53, DIG. 86, DIG. 94; 451/451; 483/3; 74/608–609

(56) References Cited

U.S. PATENT DOCUMENTS

| | | | |
|---|---|---|---|
| 5,482,414 A | * | 1/1996 | Hayashi et al. ............. 409/134 |
| 5,624,363 A | * | 4/1997 | Kuriki ........................... 483/3 |
| 6,082,939 A | * | 7/2000 | Nakashima et al. ......... 409/134 |
| 2001/0015117 A1 | * | 8/2001 | Hoppe .......................... 82/117 |

FOREIGN PATENT DOCUMENTS

| | | | |
|---|---|---|---|
| JP | 4-315546 A | * | 11/1992 |
| JP | 4-315547 A | * | 11/1992 |
| JP | 10-138085 A | * | 5/1998 |
| JP | 11-48083 A | * | 2/1999 |
| JP | 11-333655 A | * | 12/1999 |
| JP | 2000-84787 A | * | 3/2000 |
| JP | 2000-190160 | | 7/2000 |
| JP | 2000-288866 | | 10/2000 |
| JP | 2001-89764 A | * | 4/2001 |

* cited by examiner

Primary Examiner—Erica Cadugan
(74) Attorney, Agent, or Firm—Pitney Hardin LLP

(57) ABSTRACT

The machine tool includes a column that can be moved back and forth. The column supports a spindle which is adapted to hold a tool for machining a workpiece at an end thereof. A worktable located in front of the column which is adapted to hold the workpiece. A back cover is located behind the column to prevent swarf of the workpiece from being scattered into a space behind the column. The back cover is arranged to move back and forth integrally with the column.

21 Claims, 4 Drawing Sheets

MACHINE TOOL HAVING AN IMPROVED COVER

BACKGROUND OF THE INVENTION

The present invention relates to a machine tool that has an improved cover for preventing swarf and cutting fluid from being scattered.

Japanese patent provisional publications Nos. P2000-190160 and P2000-288866 disclose machine tools having a cover, or splash cover, that prevents swarf and cutting fluid from being scattered around the machine tool. The splash cover includes four cover plates, i.e. a front cover plate extending upwardly from the front edge of a bed of the machine tool, right and left cover plates mounted on the right and left side edges of the bed, respectively, and a rear cover plate located between the rear edge of the bed and a rear device box in which various kinds of devices, such as a power source, a control device, a hydraulic pressure generator, and a coolant supplying device, are accommodated.

Generally, the splash cover has an opening on each of the front, right and left cover plates, which allows placing/removing of a workpiece to/from a work area of the machine tool and also allows maintenance of a tool interchanging device, for example. A sliding door or a flap door is provided to each opening so that a user can open and close the opening.

Some machine tools have a column that is mounted on an X-Y table so that the column can be moved on the bed in back and forth direction as well as in right and left direction, and a spindle is provided to the column movably in up and down direction with respect to the column. A cutting tool is attached to the end of the spindle. Such a machine tool works on a workpiece such that the column is moved toward a worktable place on the bed and then the spindle is moved downward.

The machine tool described above requires an open space above the rear portion of the bed to allow the column to move away from the worktable. When the column is placed in the vicinity of the worktable to carry out machining of the workpiece, a part of the X-Y table, which is located on the rear portion of the bed, or behind the column, is exposed to outside and allows the swarf of the workpiece to accumulate thereon. Therefore, the user has to regularly clean the X-Y table to remove the swarf accumulated on the X-Y table, in particular, on the part thereof behind the column. However, cleaning of the narrow space within the splash cover, especially behind the column, is not easy and often results in insufficient removal of the swarf.

Therefore, there is a need for a machine tool having a cover that effectively prevents the swarf from accumulating on the area behind the column.

SUMMARY OF THE INVENTION

The present invention is advantageous in that an apparatus that satisfies the need mentioned above is provided.

According to an aspect of the invention, there is provided a machine tool that includes a bed, a worktable mounted on the bed, a table mounted on the bed which is movable in back and forth direction relative to the worktable. The machine tool further includes a column, a spindle, a main cover and a back cover. The column is mounted on the table movably in a right and left direction. The column has a front side and a rear side. The front side of the column faces the worktable. The spindle is supported by the column movably in up and down direction. One end of the spindle is adapted to hold a tool for machining the workpiece. The main cover is mounted on the bed to prevent swarf of the workpiece from being scattered around the bed. The main cover is located at a front side and right and left sides of a space defined above the bed. The back cover is fixed to the table at the rear side of the column. The back cover is long in right and left direction of the bed.

In the machining tool arranged as above, the back cover effectively blocks the swarf of the workpiece and thereby prevents the swarf from being scattered toward and accumulating on the area behind the column.

Optionally, gaps are formed between side edges of the back cover and the main cover.

Optionally, the machine tool includes a coolant supplying device provided to the rear side of the bed, and a tube located between the coolant supplying device and the back cover to allow the coolant supplied from the coolant supplying device flowing therethrough.

Alternatively or additionally, the machine tool includes a power supply provided to the rear side of the bed, which provides power required for moving the column, and a cable located between the power supply and the back cover. The power is transmitted from the power supply through the cable.

Alternatively or additionally, the machine tool includes a control device provided to the rear side of the bed, which generates control signals for moving the column, a cable located between the control device and the back cover. The control signals are transmitted from the control device through the cable.

According to another aspect of the invention, a machine tool is provided that includes a column that can be moved back and forth. The column supports a spindle which is adapted to hold a tool for machining a workpiece at an end thereof. A worktable located in front of the column which is adapted to hold the workpiece. A back cover is located behind the column to prevent swarf of the workpiece from being scattered into a space behind the column. The back cover is arranged to move back and forth integrally with the column.

Optionally, the machine tool includes a table located behind the worktable. The table is movable toward and away from the worktable. The column is mounted on the table to be moved back and forth, and the back cover is fixed to the table to move integrally with the column.

The table may have a front side facing the worktable and a rear side, and the back cover may include a blocking plate supported by a plurality of supporting members fixed to the rear side of the table. The blocking plate may be arranged to block the swarf scattered toward the space behind the column.

In some cases, the blocking plate is made of a material having large tensile strength such as metal sheet. Alternatively or additionally, the blocking plate is made of a material having high chemical resistance. For example, the blocking plate a flexible board made of synthetic fibers.

Optionally, the machine tool includes a pair of cover plates located near right and left sides of the table in parallel to a moving direction of the table. The blocking plate is arranged between and substantially perpendicular to the pair of cover plates, and predetermined gaps are formed between side edges of the blocking plate and the pair of cover plates. The gaps are sufficiently wide to avoid being clogged with the swarf of the workpiece.

Optionally the machine tool includes a pair of table covers located on right and left side portions of the table extending beyond right and left sides of the column. The pair of table covers preventing swarf from accumulating on the right and left side portions of the table.

Further optionally, the column is movable along the table in right and left direction, and each of the table covers has a telescopic structure that expands and contracts so as to prevent the exposure of the table irrespective of the position of the column on the table in right and left direction.

Alternatively or additionally, each of the table covers being formed such that the swarf on the table cover slides down into a work area of the machine tool defined in front of the table.

Alternatively or additionally, the machine tool further includes an inclined cover fixed at a front side of the back cover, which extends substantially along the entire width of the back cover. The right and left side portions of the inclined cover are overlaid at least on a rear portion of the table covers so that swarf sliding down along the back cover is guided onto the plate covers by the inclined cover.

Further optionally, the machine tool further includes a roof shape cover placed on the inclined cover between the column and the back cover. The roof shape cover has right and left inclined surfaces connected to each other to form a ridge line of the roof shape cover. The right and left inclined surfaces are inclined such that the swarf slides down on the right and left inclined surfaces toward the right and left side portions of the inclined cover, respectively.

Further optionally, the machine tool further includes an inversely inclined cover fixed at a front end of the roof shape cover. The inversely inclined cover is inclined such that the rear end thereof is lower than the front end thereof.

Optionally, the machine tool further includes a device box that accommodates at least one device required for the operation of the machine tool. The back cover is located between the column and the device box.

Optionally, the machine tool is connected with a device box located behind the machine tool. The device box is connected with the machine tool with at least one of cable and tube. The at least one of cable and tube is located between the back cover and the device box.

BRIEF DESCRIPTION OF THE ACCOMPANYING DRAWINGS

DETAILED DESCRIPTION OF THE EMBODIMENTS

Hereinafter, a machine tool according to an embodiment of the present invention will be described with reference to the accompanying drawings.

Figure 1:
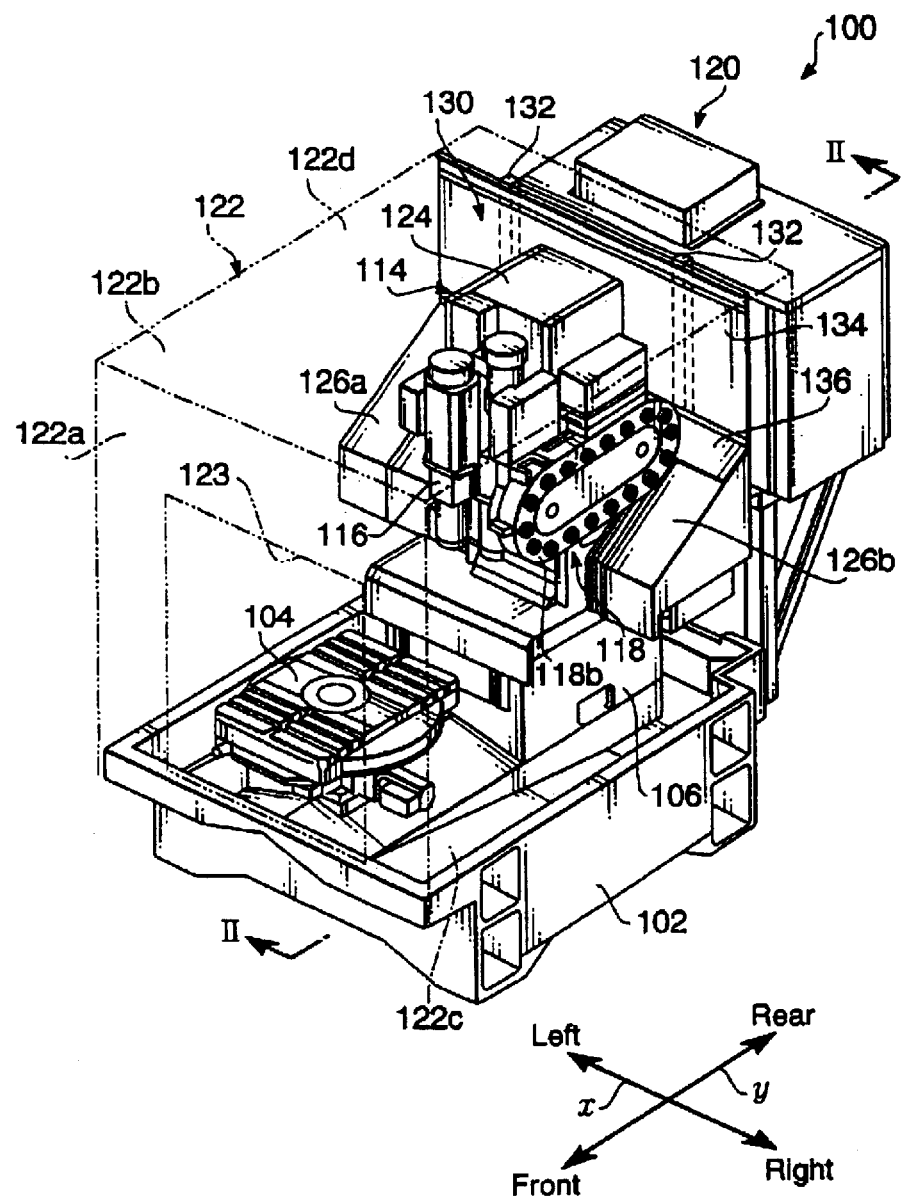
FIG. 1 is a perspective view of a machine tool according to an embodiment of the present invention.
Figure 2:
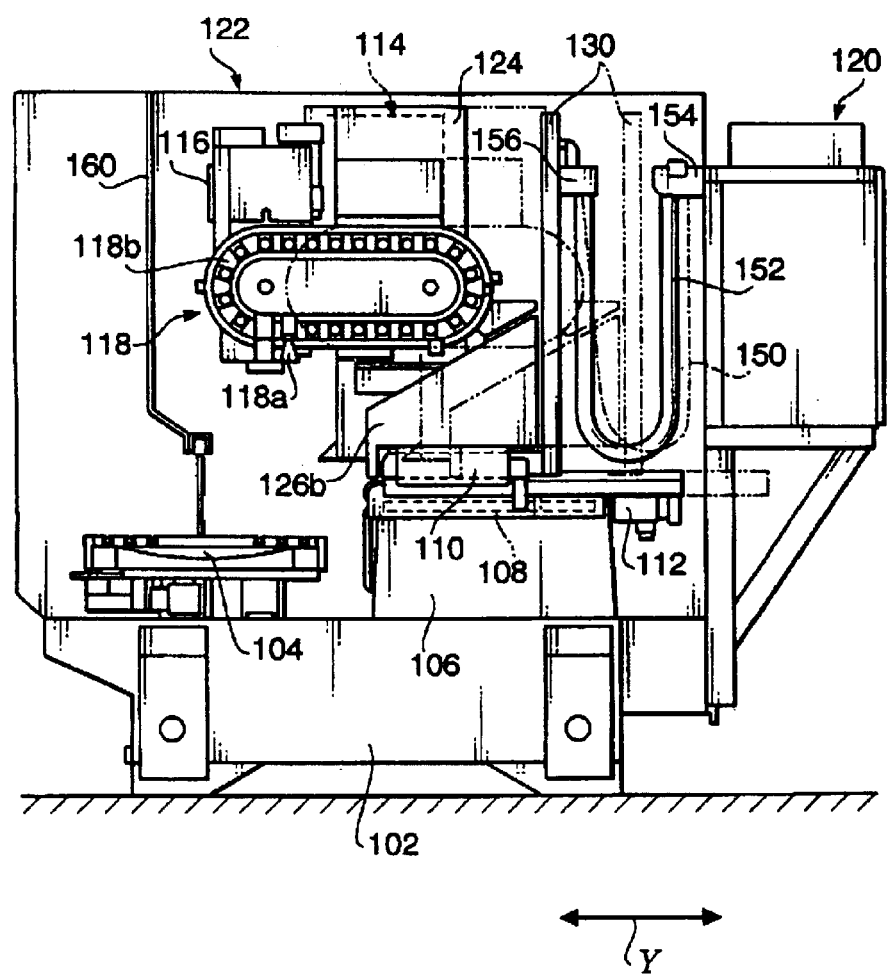
FIG. 2 is a plan view of the machine tool of FIG. 1 observed from the position and the direction indicated by the arrows II—II.

FIG. 1 is a perspective view of a machine tool 100 according to an embodiment of the present invention. FIG. 2 is a plan view of the machine tool 100 shown in FIG. 1 observed from the position and the direction indicated by the arrows II—II in FIG. 1. Note that two double headed arrows are shown in FIG. 1: one of which indicates an X axis defining a right and left direction of the machine tool 100; and the other indicates a Y axis defining a back and forth direction of the machine tool 100.

The machine tool 100 includes a main bed 102. A worktable 104 is mounted on the main bed 102 at the front side portion thereof and an additional bed 106 is mounted on the main bed 102 at the rear side portion thereof. The additional bed 106 supports a Y axis rail 108 which extends in the Y axis direction (or the back and forth direction of the machine tool 100). A Y axis table 110, which is long in X axis direction, is slidably mounted on the Y axis rail 108 so that it can be driven by a Y axis motor 112 to move back and forth along the Y axis rail 108.

A column 114, which is long in X axis direction, is mounted on the Y axis table 110 slidably along an X axis rail (not shown) which is fixed on the Y axis table and extends in the X axis direction (or the right and left direction of the machine tool 100). An X axis motor (not shown) is also provided to the machine tool 100 to drive the column 114 in the right and left direction along the X axis rail.

The front side, the right and left sides, and the upper side of the column 114 are covered with a detachable column cover 124 which is made of metal sheets. The column cover 124 is arranged to move integrally with the column 114 in both the X axis direction and the Y axis directions.

A spindle 116 is mounted to the front portion of the column 114 so as to be movable in the up and down direction. A tool interchanger 118 is also provided to the column 114 at one of the right and left sides (in the present embodiment, at the right side of the column 114).

The tool interchanger 118 has a shape elongated in the Y axis direction and has an tool conveyer 118b that carries various tools (not shown) along an oval endless track of which longitudinal axis is parallel to the X axis. A tool interchanging position 118a is defined at the bottom of the front portion of the tool interchanger 118 (see. FIG. 2). The tool attached to the lower end of the spindle 116 can be changed with one of the various tools held by the tool interchanger 118 when the lower end of the spindle 116 is moved to the tool interchanging position 118a.

The machine tool 100 configured as above carries out machining (e.g. drilling) of a workpiece (not shown) placed on the worktable 104 with the tool (not shown) attached to the lower end of the spindle 116 by moving the spindle 116 up and down and by moving the column 114, which supports the spindle 116, in X and Y axis directions.

A device box 120, which accommodates various kinds of devices required for the operation of the machine tool 100, is provided to the machine tool 100 at the rear end thereof, or at the rear end of the main bed 102. The device box 120 accommodates devices such as a power source, a control device, and a coolant supplying device. The power source supplies electrical power for moving the column 114 and rotating the spindle 116, for example. The control device generates control signals for moving the column 114 and the spindle 116, for example. The coolant supplying device supplies coolant for cooling the tool attached to the spindle.

As shown in FIG. 1, the machine tool 100 is also provided with a splash cover 122 (indicated with double-dashed lines) that prevents the swarf of the workpiece from being scattered around the machine tool 100. The splash cover 122 includes a front cover plate 122a mounted on the front edge portion of the main bed 102, right and left cover plates 122c and 122b mounted on the right and left edge portions of the main bed 102, respectively, and a top plate 122d placed on the upper ends of the front, right and left cover plates (122a, 122c, 122b). The four cover plates (122a, 122b, 122c, 122d) mentioned above are made of metal sheets.

An opening 123 is formed on the front cover plate 122a. Similar openings are also formed on the right and left cover plates (122c, 122b) although they are not shown in FIG. 1 for brevity of the drawing. A door (not shown) which may be a sliding door or a flap door is provided at each opening 123. The opening 123 allows an user of the machine tool 100 to place/remove a workpiece to/from the worktable 104 therethrough, and to carry out maintenance of the machine tool 100 such as changing the tools of the tool interchanger 118 and cleaning of the swarf scattered within the machine tool 100.

A pair of dustproof table covers 126b and 126a are provided on right and left side portions of the Y axis table 110 extending beyond the right and left sides of the column cover 124. The pair of table covers 126b and 126a covers the right and left portions of the Y axis table 110 to prevent the swarf from adhering and/or accumulating thereon. Each of the table covers 126a and 126b has a telescopic structure that expands and contracts in the X axis direction in accordance with the movement of the column 114 (and column cover 124) so as to prevent the exposure of the Y axis table 110 irrespective of the position of the column 114 on the Y axis table 110.

Figure 3:
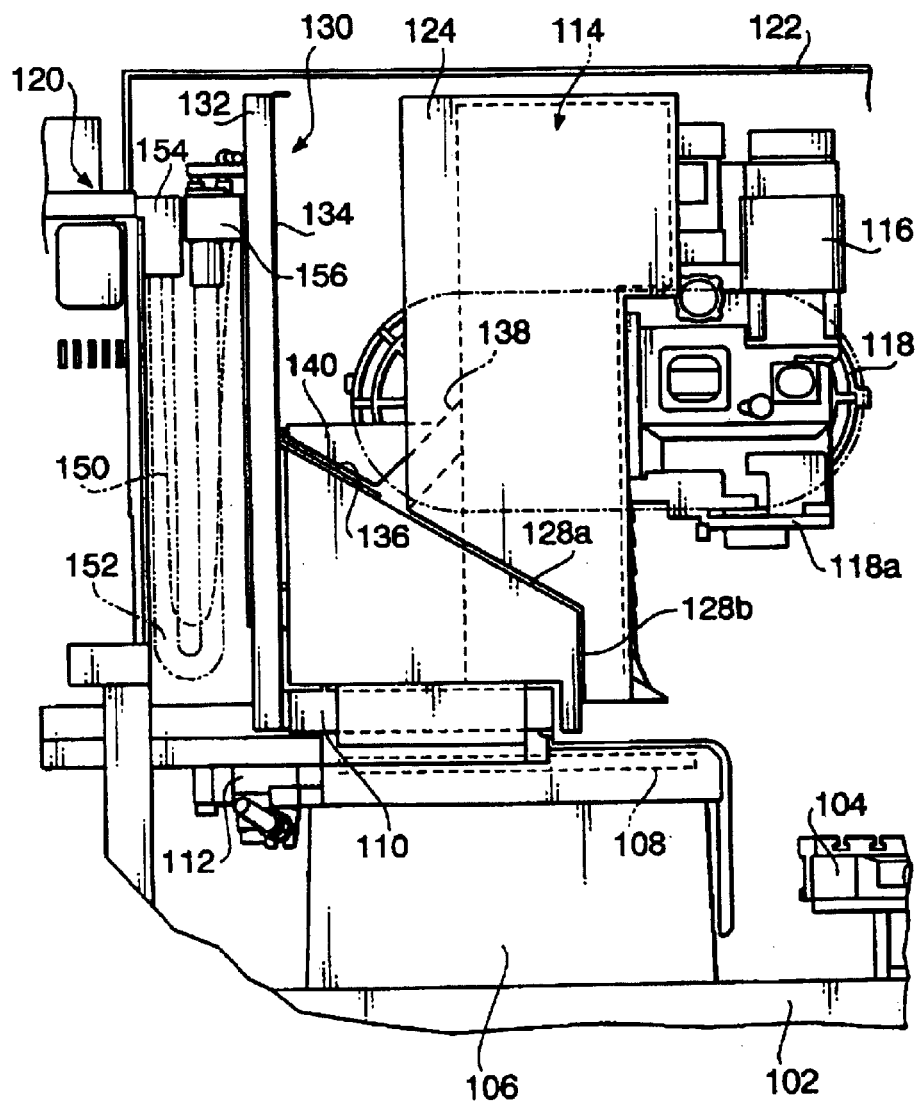
FIG. 3 is an enlarged left side view of a portion of the machine tool of FIG. 1.
Figure 4:
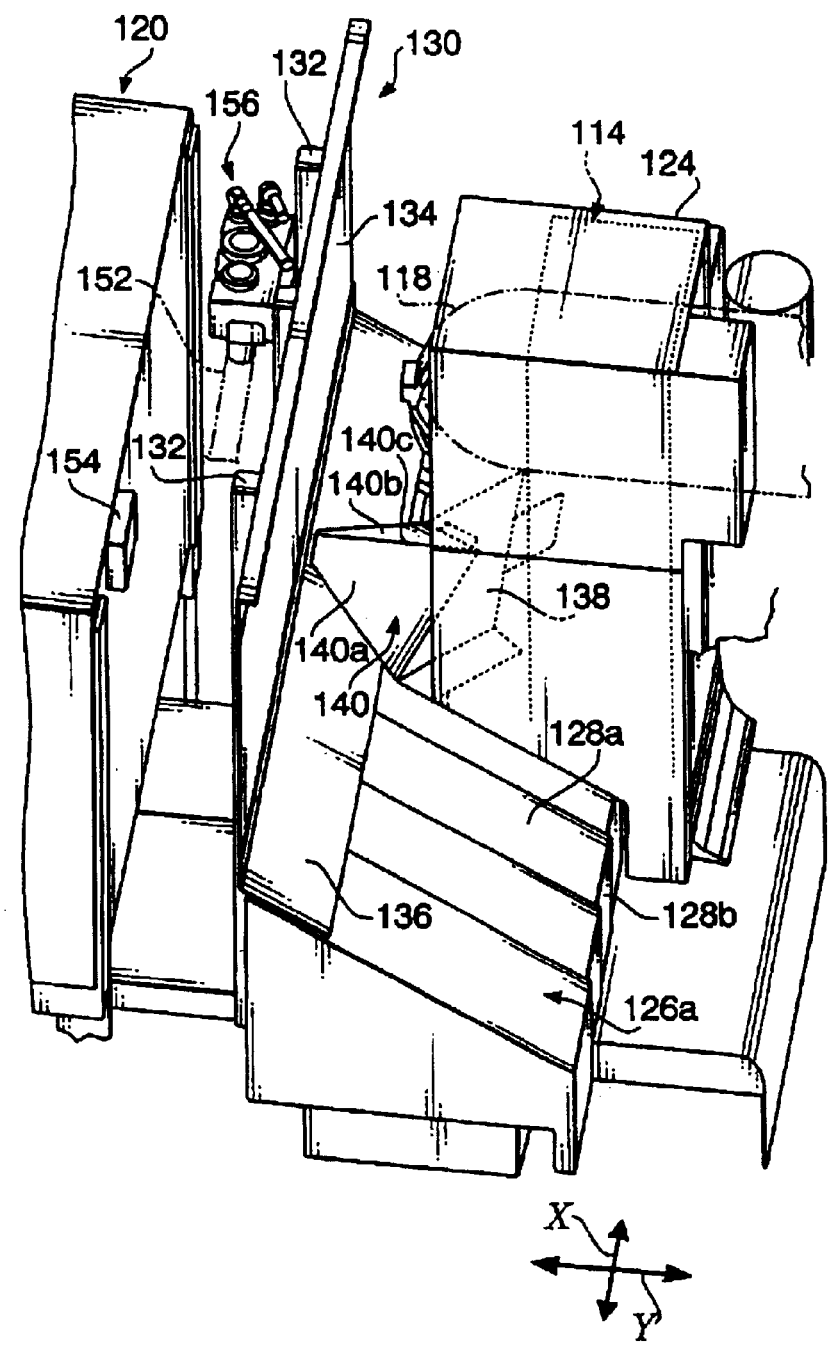
FIG. 4 is a perspective view of the main part of the machine tool of FIG. 1.

FIG. 3 is an enlarged left side view of a portion of the machine tool 100 shown in FIG. 1, and FIG. 4 is a perspective view of a main part of the machine tool 100 shown in FIG. 1.

As can be seen in FIG. 3, the table cover 126a located on the left of the column cover 124 includes an inclined plate 128a and a vertical plate 128b extending vertically downward from the front edge (the right-hand side edge in FIG. 3) of the inclined plate 128a. The inclined plate 128a is inclined against the top surface of the Y axis table 110 by locating the rear edge thereof (the left-hand side edge in FIG. 3) higher than the front edge. Thus, if the swarf of the workpiece falls down on the inclined plate 128a, it slides down along the inclined plate 128a toward the front area of the Y axis table 110, or work area of the machine tool 100.

Note that the table cover 126b on the right side of the column cover 124 has substantially the same structure as that of the table cover 126a located on the left side of the column cover 124.

A back cover 130 is provided to the rear end of the Y axis table 110 so that it moves back and forth integrally with the Y axis table 110. As shown in FIG. 4, the back cover 130 has substantially the same length in X axis direction as the Y axis table 110. The back cover 130 includes a plurality of supporting members or props 132 and a blocking plate 134 supported by the props 132.

The props 132 are spaced apart from each other in the X axis direction by a predetermined distance and fixed to the rear side of the Y axis table 110 at their lower end portions so as to extend upward from the Y axis table 110.

The blocking plate 134 is a metal sheet, for example, attached to the front side of the props 132. It should be noted that the blocking plate 134 may be made of any material that has large tensile strength and high chemical resistance. Thus, one example of the blocking plate 134 is a flexible board made of aromatic polyamide synthetic fibers.

The blocking plate 134 is formed in a dimension such that there are gaps between side edges of the blocking plate 134 and the right and left cover plates 122c and 122b of the splash cover 122. These gaps are formed wide enough to avoid being clogged with the swarf of the workpiece. The clogging of the above mentioned gaps with the swarf causes damage to both of the back cover 130 and the splash cover 122 as the back cover 130 is moved back and forth along the Y axis direction, and also increases resistance to the back and forth movement of the Y axis table 110 to which the back cover 130 is fixed. The clogging also causes compression and expansion of the air within the splash cover 122 (or the work area of the machine tool 100) as the back cover 130 moves back and forth, which may generates abnormal noise. However, in the machine tool 100 according to the embodiment, such inconvenience does not occur since the wide gaps are formed between the back cover 130 and the right and left cover plates 122c and 122b.

As shown in FIGS. 3 and 4, an inclined cover 136 is fixed to the back cover 130 at the lower portion of the front side of the blocking plate 134. The inclined cover 136 is arranged such that the front end thereof is lower than the rear end thereof. The inclined cover 136 extends substantially along the entire width (in the X axis direction) of the blocking plate 134.

The middle portion of the inclined cover 136 extends over a gap formed between the column cover 124 and the back cover 130. The right and left side portions of the inclined cover 136 are placed over the inclined plates 128a of the right and left table covers 126b and 126a. The inclined cover 136 is shorter than the inclined plates 128a in the Y axis direction. Therefore, the inclined cover 136 overlaps only on the rear portions of the inclined plates 128a.

A roof shape cover 140 is fixed on the inclined cover 136 between the column cover 124 and the back cover 130. Further, an inversely inclined plate 138 is fixed to the front end of the roof shape cover 140. The inversely inclined plate 138 is located between the rear portions of the right and left side walls of the column cover 124. The inversely inclined plate 138 is arranged such that the rear end thereof is lower than the front end thereof. The inversely inclined plate 138 is also arranged such that its rear end is located above the inclined cover 136 (see FIG. 3). Thus, if the swarf of the workpiece falls on the inversely inclined plate 138, it slides down toward the rear end thereof and drops down on the inclined cover 136.

As shown in FIG. 4, the roof shape cover 140 has right and left inclined surfaces 140b and 140a which are connected at the center of the roof shape cover 140 to form a ridge line 140c that is substantially parallel to the Y axis and located higher than the inclined cover 136. Thus, the swarf of the workpiece fallen down on the roof shape cover 140 slides down along either the left inclined surface 140a or the right surface 140b toward the side portions of the inclined cover 136 overlaid on the left or right table covers (126a, 126b).

In the machine tool 100 configured as above, the swarf of the workpiece is prevented from being scattered into the space behind the column 114. Accordingly, the swarf does not accumulate on an area behind the column. Further, the scattered swarf does not reach the device box 120 located behind the back cover 130. Thus, the devices in the device box 120, in particular the electronic devices, will not suffer damage from the swarf and the coolant droplets.

The swarf and the coolant scattered and then bumped into the back cover 130 slide down, in turn, the back cover 130 (the blocking plate 134), the inclined cover 136 and then the table covers 126a and 126b to be gathered into the work area of the machine tool 100 defined in front of the Y axis table 110 and the column 114. The swarf and the coolant that have fallen down between the column cover 124 and the back cover 130 are also gathered into the work area as they slide along the inversely inclined plate 138, the roof shape cover 140, and then along the inclined cover 136 and the table covers 126a and 126b. As a result, the swarf does not accumulate on the Y axis table 110, in particular, on the Y axis table 110 between the column cover 124 and the back cover 130. Thus, the cleaning of the scattered swarf and the coolant within the machine tool 100 according to the invention is quite easy.

As shown in FIG. 3, cables 150 for providing electric power and/or control signals and flexible tubes 152 for supplying coolant and/or hydraulic pressure are arranged in a space defined between the back cover 130 and the device box 120. The cables 150 and the flexible tubes 152 extend out from a supplying portion 154 formed at the upper portion of the device box 120 and connected to a connecting portion 156 provided at the upper portion of the back cover 130. The cables 150 and the flexible tubes 152 are bent in a U shape to allow the back cover 130 to move back and forth in the Y axis direction.

Since the cables 150 and the flexible tubes 152 are located behind the back cover 130 which blocks the scattered swarf, the swarf does not cause damage to or accumulate on the cables 20 and flexible tubes 152. Therefore, it is not necessary to cover the cables 150 and the flexible tubes 152 with additional protective covers.

The back cover 130 which is long in X axis direction (right and left direction) hides the cables 150 and flexible tubes 152 from the work area of the machine tool 100 and thereby serves to provide better design of the work area.

As shown in FIG. 2, a partition 160 may be provided above the worktable 104 for dividing the space within the splash cover 122 into two areas along the Y axis direction. Further, the worktable 104 may be configured rotatable around a vertical axis penetrating the center of the worktable 104. In the machine tool 100 arranged as above, the working efficiency can be enhanced by placing a plurality of workpieces on the worktable 104 along a peripheral area thereof, machining the workpiece located below the spindle 116, turning the worktable 104 to convey the machined workpiece near the opening 123 of the front cover plate 122a, and replacing the machined workpiece with a new one through the opening 123 while machining another workpiece located below the spindle 3.

The present disclosure relates to the subject matter contained in Japanese Patent Application No. P2002-086226, filed on Mar. 26, 2002, which is expressly incorporated herein by reference in its entirety.

What is claimed is:

1. A machine tool for machining a workpiece, comprising:
a bed;
a worktable mounted on said bed;
a table mounted on said bed, said table being movable in back and forth directions relative to said worktable;
a column mounted on said table, said column being movable in right and left directions with respect to the back and forth directions, said column having a front side and a rear side, said front side of said column facing said worktable;
a spindle supported by said column, said spindle being movable in up and down directions, one end of said spindle being adapted to hold a tool for machining said workpiece;
a main cover mounted on said bed to prevent swarf of the workpiece from being scattered around said bed, said main cover located at a front side and right and left sides of a space defined above said bed; and
a back cover fixed to said table at the rear side and behind said column, said back cover being long in the right and left directions of said bed.

2. The machine tool according to claim 1, further comprising;
a coolant supplying device provided to the rear side of said bed; and
a tube located between said coolant supplying device and said back cover, the coolant supplied from said coolant supplying device flowing through said tube.

3. The machine tool according to claim 1, further comprising:
a power supply provided to the rear side of said bed, said power supply providing power required for moving said column; and
a cable located between said power supply and said back cover, the power being transmitted from said power supply through said cable.

4. The machine tool according to claim 1, further comprising:
a control device provided to the rear side of said bed, said control device generating control signals for moving said column; and
a cable located between said control device and said back cover, the control signals being transmitted from said control device through said cable.

5. The machine tool according to claim 1, wherein gaps are formed between said main cover and side edges of said back cover.

6. The machine tool according to claim 1, further comprising a device box accommodating at least one device required for the operation of said machine tool, and
wherein said back cover is located between said column and said device box.

7. The machine tool according to claim 1, which is connected with a device box located behind said machine tool, the device box being connected with said machine tool with at least one of a cable and a tube, said at least one of a cable and a tube being located between said back cover and the device box.

8. A machine tool for machining a workpiece, comprising:
a column that can be moved in back and forth directions, said column supporting a spindle, said spindle being adapted to hold a tool for machining a workpiece at an end of said spindle;
a worktable located in front of said column, said worktable being adapted to hold the workpiece;
a back cover located behind said column and configured to prevent swarf of the workpiece from being scattered into a space behind said column, said back cover being arranged to move back and forth integrally with said column.

9. The machine tool according to claim 8, further comprising:
a table located behind said worktable, said table being movable toward and away from said worktable in the back and forth directions,
wherein said column is mounted on said table to be moved in the back and forth directions, and
wherein said back cover is fixed to said table to move integrally with said column.

10. The machine tool according to claim 9,
wherein said table has a front side and a rear side, said front side facing said worktable, and
wherein said back cover includes a blocking plate supported by a plurality of supporting members fixed to the rear side of said table, said blocking plate being arranged to block the swarf scattered toward the space behind said column.

11. The machine tool according to claim 10, wherein said blocking plate is made of a flexible board material.

12. The machine tool according to claim 10, further comprising:
a pair of cover plates located near right and left sides of said table in parallel to a moving direction of said table,
wherein said blocking plate is arranged between and substantially perpendicular to said pair of cover plates, predetermined gaps being formed between side edges of said blocking plate and said pair of cover plates, said gaps being sufficiently wide to avoid being clogged with the swarf of the workpiece.

13. The machine tool according to claim 9, further comprising,
a pair of table covers located on right and left side portions of said table with respect to the back and forth directions, extending beyond right and left sides of said column, said pair of table covers preventing swarf from accumulating on said right and left side portions of said table.

14. The machine tool according to claim 13,
wherein said column is movable along said table in the right and left directions, and
wherein each of the table covers has a telescopic structure that expands and contracts so as to prevent the exposure of said table irrespective of the position of said column on said table in the right and left directions.

15. The machine tool according to claim 13, wherein each of said table covers is formed such that the swarf on said table cover slides down into a work area, which is defined in front of said table, of said machine tool.

16. The machine tool according to claim 13, further comprising an inclined cover inclined with respect to said back cover and fixed at a front side of said back cover, said inclined cover extending substantially along the entire width of said back cover, right and left side portions of said inclined cover being overlaid at least on a rear portion of said table covers so that swarf sliding down along said back cover is guided onto said table covers by said inclined cover.

17. The machine tool according to claim 16, further comprising a roof shape cover placed on said inclined cover between said column and said back cover, said roof shape cover having right and left inclined surfaces connected to each other to form a ridge line of said roof shape cover, said right and left inclined surfaces being inclined such that the swarf slides down on said right and left inclined surfaces toward said right and left side portions of said inclined cover, respectively.

18. The machine tool according to claim 17, further comprising an inversely inclined cover fixed at a front end of said roof shape cover, said inversely inclined cover being inclined such that the rear end thereof is lower than the front end thereof.

19. The machine tool according to claim 10, wherein said blocking plate is made of an aromatic polyamide synthetic fiber material.

20. The machine tool according to claim 10, wherein said blocking plate is a metal sheet.

21. The machine tool according to claim 10, wherein said blocking plate is a flexible board made of synthetic fibers.

* * * * *